(12) United States Patent
Rembe

(10) Patent No.: US 7,443,513 B2
(45) Date of Patent: Oct. 28, 2008

(54) APPARATUS FOR OPTICAL MEASUREMENT OF AN OBJECT

(75) Inventor: Christian Rembe, Waldbronn (DE)

(73) Assignee: Polytec GmbH, Waldbronn (DE)

( * ) Notice: Subject to any disclaimer, the term of this patent is extended or adjusted under 35 U.S.C. 154(b) by 390 days.

(21) Appl. No.: 11/136,866

(22) Filed: May 25, 2005

(65) Prior Publication Data

US 2005/0280830 A1 Dec. 22, 2005

(30) Foreign Application Priority Data

Jun. 22, 2004 (EP) ................................. 04014638

(51) Int. Cl.
*G01D 5/32* (2006.01)
*G01B 11/02* (2006.01)

(52) U.S. Cl. ........................................ 356/511; 73/655

(58) Field of Classification Search ......... 356/511–515, 356/502; 73/655–657
See application file for complete search history.

(56) References Cited

U.S. PATENT DOCUMENTS

| | | | |
|---|---|---|---|
| 4,844,617 A * | 7/1989 | Kelderman et al. ......... | 356/624 |
| 4,931,630 A * | 6/1990 | Cohen et al. ............. | 250/201.3 |
| 5,083,869 A * | 1/1992 | Nakata et al. ............. | 356/432 |
| 5,122,648 A * | 6/1992 | Cohen et al. ............. | 250/201.3 |
| 5,129,724 A * | 7/1992 | Brophy et al. ............ | 356/503 |
| 5,377,006 A * | 12/1994 | Nakata ...................... | 356/486 |
| 6,084,672 A | 7/2000 | Lewin | |
| 6,587,212 B1 * | 7/2003 | Barber et al. ............. | 356/502 |
| 6,906,803 B2 * | 6/2005 | Hendriks et al. ........... | 356/484 |
| 7,079,258 B2 * | 7/2006 | Selbach et al. ............ | 356/502 |
| 7,177,029 B2 * | 2/2007 | deGroot .................... | 356/497 |

FOREIGN PATENT DOCUMENTS

EP 0 352 789 1/1990
WO WO 9704706 A1 * 2/1997

\* cited by examiner

*Primary Examiner*—Patrick Connolly
*Assistant Examiner*—Scott M Richey
(74) *Attorney, Agent, or Firm*—Volpe and Koenig, P.C.

(57) ABSTRACT

An apparatus for optical measurement of an object, especially for measuring movement, is provided, which includes an interferometer for measuring movements along the measurement beam of the interferometer, as well as a confocal auto-focus microscope. The interferometer is coupled in the beam path of the confocal auto-focus microscope, such that the measurement beam of the interferometer is simultaneously the focusing beam of the microscope. Here, it is guaranteed that the interferometric movement measurement is always performed at the focal point of the microscope that is used. This enables automatic correction of the Guoy effect for objectives with high numerical aperture. In addition, for the use of a scanning confocal auto-focus microscope, data sets of test objects can also be measured, which comprise their vibrational behavior, height profile, and optionally also their in-plane movement behavior.

22 Claims, 1 Drawing Sheet

APPARATUS FOR OPTICAL MEASUREMENT OF AN OBJECT

BACKGROUND

The invention relates to an apparatus for optical measurement of an object, especially for measuring movement.

Accordingly, the apparatus comprises an interferometer for measuring movements along the axis of the measurement beam of the interferometer and a microscope with an objective and a focusing device, wherein the focusing device is embodied such that it can change the relative position of the object and the focal point of the objective relative to each other, wherein the interferometer and the microscope are allocated relative to each other, such that the measurement beam of the interferometer is projected onto the object over the beam path of the microscope.

The interferometer enables the measurement of movements along the axis of the measurement beam, that is, in general, movements perpendicular to the object plane of the microscope. In general, a laser Doppler vibrometer is used, for which a measurement point is illuminated on the object with coherent laser light. The movement of the surface of the object results in a Doppler shift of the frequency of the light reflected at the surface. An evaluation of this frequency shift or an equivalent phase shift by means of a demodulator enables the determination of the speed of the movement of the object surface at the measurement point. From the profile of this speed, the acceleration rate of the object surface at the measurement point can also be calculated. The principle design of such a measurement apparatus is described, for example, in the DE technical journal "Technisches Messen [Technical Measurement]—tm" 57 (1990), pages 335 to 345.

For measuring the movements of small objects, especially the movements or vibrations of miniaturized components in microsystem technology, frequently interferometers are used, whose measurement beam is projected over the beam path of a microscope onto the object to be measured.

The measurement beam of the interferometer can be aligned by means of the microscope on a defined measurement point on the object, wherein preferably the measurement point to be measured on the object comes to lie approximately at the focal point of the microscope, so that the measurement beam at the measurement point has the smallest extent possible and thus the smallest area possible is illuminated on the object, so that high local resolution is possible.

U.S. Pat. No. 6,084,672 discloses an apparatus for optical measurement of an object, especially for path and/or vibration measurement. The measurement is performed by means of a laser interferometer, wherein its measurement beam is coupled into the beam path of a microscope. The measurement beam reflected by the object is, in turn, decoupled from the beam path of the microscope and returned into the measurement system. Furthermore, the apparatus comprises a device for approximately parallel shifting of the measurement beam, so that multiple successive points can be measured on the object, without moving the measurement object.

SUMMARY

The invention is based on the objective of improving an apparatus of the above-noted type to the extent that a higher accuracy of the measurement can be achieved.

This objective is met through an apparatus for optical measurement of an object with the features of the present invention, as well as by a method in accordance with the present invention.

Advantageous embodiments of the apparatus according to the invention are described below; and preferred refinements of the method according to the invention are also set forth herein.

The invention differs from the previously known state of the art fundamentally in that the microscope is embodied as a confocal auto-focus microscope. The confocal auto-focus microscope has a focus controller, a focus detector, a focusing device, and a light source for generating a focusing beam.

In the apparatus according to the invention, the interferometer is used as a light source for generating the focusing beam, that is, the measurement beam of the interferometer is also used as a focusing beam for focusing the confocal auto-focus microscope.

The focusing beam generated by the interferometer is projected via the objective of the confocal auto-focus microscope onto the object, that is, onto the measurement point of the object to be measured and reflected or scattered by the object. The reflected or scattered measurement beam is, in turn, projected over the beam path of the confocal auto-focus microscope onto the focus detector.

The focus detector transmits measurement signals directly or via signal evaluation units to the focus controller, which, in turn, is equipped with the focusing device in an interactive way. Depending on the measurement signals of the focus detector, the focus controller regulates the focusing device such that the measurement point of the object comes to lie at the focal point of the objective. The focusing device can be embodied such that it can shift the objective essentially perpendicular to the measurement beam of the interferometer and/or it can be embodied such that it can move the object relative to the microscope essentially perpendicular to the measurement beam of the interferometer.

Furthermore, the microscope of the apparatus according to the invention has a spatial filter, which is arranged in the beam path of the confocal auto-focus microscope such that it can essentially suppress non-focal beams. Thus, beams, which are incident on the objective from outside the focal point of the objective and which are coupled into the beam path of the microscope, are essentially suppressed by the spatial filter. In particular, the non-focal beams are stopped by the spatial filter from entering the beam path of the interferometer. The spatial filter is typically realized as an aperture or pinhole.

Thus, the apparatus according to the invention has the additional advantage that errors in the measurement data of the interferometer caused by non-focal beams being superimposed in the interferometer with focal beams are essentially excluded.

Thus, for the first time it is possible with the apparatus according to the invention to project the measurement beam of an interferometer over the beam path of a confocal auto-focus microscope onto an object and to return the reflected or scattered measurement beam over the beam path of the confocal auto-focus microscope into the interferometer, wherein a focus controller guarantees that the object comes to lie at the focal point without requiring manipulations by the user.

It is advantageous for several reasons to perform measurements only when the measurement point on the object is located at the focal point of the objective:

First, a measurement with the measurement point at the focal point of the objective guarantees a measurement point with the smallest extent possible and thus the highest local resolution possible.

In addition, for a measurement, measurement errors in the data of the interferometer can occur, which are caused by the occurrence of effects of diffraction when the measurement beam passes through the microscope:

Thus, it is known that the focusing of a monochromatic light beam can lead to a phase shift. This so-called Guoy effect is dependent on the strength of the focusing, such that stronger focusing leads to a greater change in phase.

As mentioned above, however, in an interferometer, just the phase difference of the measurement beam projected onto the surface and of the measurement beam reflected by the object surface is used for determining the movement speed of the object surface. A change of the phase due to the Guoy effect thus leads to an incorrectly determined phase difference and thus to errors in the measurement data of the interferometer.

The size of the measurement error due to the Guoy effect, however, is not dependent only on the strength of the focusing of the measurement beam, but also on how far the object surface reflecting the measurement beam is away from the focal point of the objective. The greater the distance between the focal point and the surface of the object reflecting the measurement beam, the stronger the measurement error due to the Guoy effect changes for a change in distance.

The change of the measurement error due to the Guoy effect at the focal point is 0, i.e., a small distance of the surface reflecting the measurement beam from the focal point merely leads to a small change of the measurement error, such that it is typically negligible. Therefore, a correction of the measurement error due to the Guoy effect is significantly more exact when the measurement point of the object is located at the focal point of the objective, because in this case changes in the distance between the measurement point of the object and the focal point, which can be caused by the movement of the object or by inaccuracies, vibrations, or shocks to the measurement apparatus, as mentioned lead only to small changes of the measurement error due to the Guoy effect. If the measurement error due to the Guoy effect is known, then it can thus be corrected with higher accuracy, as long as the measurement point of the object is located at the focal point.

In contrast, if the measurement point of the object is not located at the focal point, then small changes in the distance of the measurement point of the object to the focal point of the objective lead to significantly greater changes in the measurement error due to the Guoy effect. Even if the measurement error due to the Guoy effect is also known outside of the focal point, it can be only imprecisely corrected, because inaccuracy in the determination of the distance from the measurement point on the object to the focal point of the objective leads to a comparatively large inaccuracy in the determination of the measurement error due to the Guoy effect.

For practical applications, this means that measurement errors in the measurement data of the interferometer, which are based in the Guoy effect, can be realistically corrected only when the object is at the focal point.

In a preferred embodiment, the apparatus comprises a correction unit, which is connected to the interferometer. The correction unit is used for correcting the measurement error in the measurement data of the interferometer, especially of errors, which are based in the Guoy effect described above.

The error in the measurement data of the interferometer based on the Guoy effect essentially depends on the strength of the focusing of the measurement beam—as long as the measurement point of the object is at the focal point of the objective.

A correction of the measurement error due to the Guoy effect thus can be performed in the following way:

First, with an objective with smaller numerical aperture, that is, an objective, which only weakly focuses the measurement beam compared with an objective with higher numerical aperture, a calibration object, such as, for example, a piezoelectric vibrator, is measured. The piezoelectric vibrator vibrates due to external electrical excitation. These vibrations are measured by the apparatus according to the invention by means of the interferometer. Due to the low numerical aperture of the objective, the measurement error of the Guoy effect is also negligible. The measurement data of the interferometer is thus only extremely slightly afflicted with a measurement error due to the Guoy effect.

Then the measurement is repeated, wherein for this measurement, an objective with higher numerical aperture is used, for which the measurement error due to the Guoy effect is not negligible. By comparing the two measurements, a calibration for the objective with higher numerical aperture can be determined.

Preferably, the correction unit of the apparatus according to the invention contains calibration data, which is used by the correction unit for correcting the measurement error in the data of the interferometer due to the Guoy effect.

Microscopes generally have multiple objectives available with different numerical apertures, so that different enlargements or focusings of measurement beams projected by the microscope are possible with one microscope.

In another preferred embodiment, the apparatus according to the invention comprises at least two objectives with different numerical aperture, which are arranged on the microscope such that one of the two objectives can be selectively placed in the beam path of the microscope. Typically, the objectives are arranged on a rotary table, so that by turning the rotary table, the desired objective can be pivoted into the beam path of the microscope.

Because the measurement error in the data of the interferometer due to the Guoy effect essentially depends on the strength of the focusing and thus essentially on the objective that is used, if the measurement point of the object is at the focal point of the objective, then according to the methods described above for different objectives with different numerical apertures, a calibration data set can be created for each one.

The advantageous embodiment of the invention thus preferably comprises a calibration database, in which the calibration data sets for the objectives of the apparatus are stored. The correction unit is preferably embodied such that according to the objective that is used, the corresponding calibration data set from the calibration database can be selected, so that the correction unit corrects the measurement error in the measurement data of the interferometer with this calibration data.

The selection of the calibration data from the calibration database can be realized, for example, such that the user inputs characteristic data of the objective that is used, such as, for example, the focal length or an identification number of the objective, into the correction unit, whereupon the correction unit selects the corresponding calibration data set.

However, automatic methods are also conceivable, for example, in which an identification unit is arranged on the microscope, which identifies the objective that is used and outputs a corresponding signal to the correction unit, which selects the calibration data set allocated to the objective that is used depending on this signal and performs the corrections of the measurement error in the measurement data of the interferometer with this data set.

In another preferred embodiment, the confocal auto-focus microscope of the apparatus according to the invention has an evaluation unit, which is connected to the focus controller. The evaluation unit evaluates the control signals of the focus controller and/or stores the evaluated or non-evaluated control signals.

The focus controller regulates the focusing device depending on the signals of the focus detector, such that the measurement point of the measurement object comes to lie at the focal point of the objective. Thus, the control signals of the focus controller are a measure for the distance between the focal point of the objective and the measurement point of the object before the automatic focusing. Especially for a scanning measurement method, for which several locally different measurement points of the object are measured, a height profile of the object can be created.

The control signals of the focus controller, which are necessary to bring a second measurement point into focus after the focusing of one measurement point, are a measure for the height difference of the two measurement points. By scanning the object by means of many successive measurement points, the relative height difference of the measurement points can be calculated relative to each other.

In another preferred embodiment, the confocal auto-focus microscope of the apparatus according to the invention is embodied as a scanning confocal auto-focus microscope. The microscope comprises at least one optical shift element, which is arranged in the beam path of the confocal auto-focus microscope. By means of the optical shift element, the measurement beam can be shifted and/or tilted, so that the measurement beam can be projected selectively onto several different measurement points of the object.

Furthermore, the measurement beam can also be aligned selectively onto several locally different measurement points on the object, such that the object is moved relative to the microscope by means of an object shifting apparatus. According to the desired arrangement of the measurement points, a linear shift in one of three spatial directions, preferably, however, perpendicular to the measurement beam of the interferometer, is performed, but similarly, a rotation of the object is also conceivable.

In addition, it can be preferably to provide both the optical shift element and the object shifting apparatus in an apparatus according to the invention.

The scanning confocal auto-focus microscope of the embodiment according to the invention further comprises a scanner controller unit, which interacts with the optical shift element and/or the object shifting apparatus. Here, the scanner controller unit regulates the mentioned components, such that the measurement beam is projected selectively onto at least two locally different measurement points of the object. Preferably, the measurement points to be measured are set before the beginning of the measurement, especially stored in a measurement database of the scanner controller unit.

For this embodiment, in which the confocal auto-focus microscope is embodied as a scanning confocal auto-focus microscope, it is preferable if the evaluation unit is also connected to the interferometer and to the scanner controller unit and comprises a memory unit, so that focus controller data, scanner controller unit data, and interferometer data can be stored. The focus controller data can be composed of the evaluated or non-evaluated control signals of the focus controller; the scanner controller unit can be composed of the evaluated or non-evaluated control signals of the scanner unit or from the data of the measurement point database of the scanner controller unit. Similarly, the data of the interferometer can be composed of the evaluated or non-evaluated measurement data of the interferometer.

Thus, the focus controller contains information on the height of the measurement point, i.e., the z spatial coordinate, while the data of the scanner controller unit contains information on the position of the measurement point in a spatial plane, which is essentially parallel to the object plane of the microscope, i.e., the (x,y) spatial coordinates.

It is essential that the memory unit allocates the focus controller data, the scanner controller unit data, and the interferometer data for each measurement point of the object relative to each other.

Thus, for each measurement point, there is a data set, which contains data on the movement of the object at the position of the measurement point and on the (x, y, z) spatial coordinates of the measurement point.

Here, it is preferably that the evaluation unit is connected over the correction unit to the interferometer, so that the stored data of the interferometer is already corrected, i.e., no longer exhibits the measurement error due to the Guoy effect.

Preferably, the interferometer is embodied as a laser Doppler vibrometer.

Because the microscope in the apparatus according to the invention is embodied as a confocal microscope, non-confocal beams, i.e., beams, which are led from outside the focal point of the objective into the beam path of the microscope, are essentially suppressed by means of a spatial filter. This means that the intensity of the measurement beam reflected by the object is a maximum after passage through the spatial filter, when the measurement point of the object is at the focal point. If the measurement point of the object comes outside of the focal point of the objective, then the measurement beam reflected by the object is suppressed by the spatial filter and the more the measurement point moves from the focal point of the objective, the stronger it is suppressed. If an object is moved through the focal point of the objective, then an intensity distribution of the reflected measurement beam is obtained, which has a maximum at the position, at which the measurement point of the object is located at the focal point of the objective. Thus, this maximum in the intensity of the reflected measurement beam can be used for determining the focal point position of the measurement point of the object.

The focus detector is preferably embodied as a photodetector. Here, it is especially useful if the apparatus comprises a beam splitter for the measurement beam, wherein this beam splitter is arranged in the beam path of the apparatus, such that a portion of the measurement beam decoupled by means of the beam splitter for the measurement beam is incident on the focus detector.

The beam splitter for the measurement beam can be arranged between the aperture-like optical element and the interferometer in the beam path of the apparatus, so that the portion of the measurement beam not decoupled by the beam splitter for the measurement beam is coupled into the interferometer.

Typically, the interferometer comprises a movement intensity detector, which is arranged in the beam path of the interferometer, such that beams superimposed in the interferometer are projected onto the movement intensity detector. It is especially useful in this case if the movement intensity detector is also used as a focus detector. In this case, the previously mentioned beam splitter is not necessary.

The movement intensity detector is thus used first for determining the phase difference of the beams superimposed in the interferometer, for determining the movement of the measurement point of the object, and second, however, by means of the movement intensity detector, the automatic focusing is also performed.

In another preferred embodiment, at least one optical shift element is embodied as a scanning mirror, especially as a piezoelectric scanning mirror.

However, similarly it is also possible to move, instead of the measurement beam, the object relative to the microscope, especially to shift in the object plane of the microscope and/or to rotate the object about an arbitrary spatial axis, so that the measurement beam fixed in location relative to the microscope is incident on different measurement points of the object.

This can be achieved by a correspondingly embodied object holder, which is preferably embodied as an electrically driven XY table.

The embodiments described above thus permit the determination of the movement of measurement points of the object along the optical axis of the measurement beam of the interferometer, as well as the determination of a height profile of the measurement points of the object. In addition, due to the known control signals for the optical shift element or the object shift device, the positions of the measurement point are determined in the plane perpendicular to the measurement beam of the vibrometer. Thus, for a measurement point, an (X, Y, Z) spatial coordinate of the movement of the object measured by means of the interferometer can be allocated to this measurement point.

In addition, it is advantageous when movements can also be measured by the apparatuses according to the invention, whose direction of movement is not parallel to the optical axis of the measurement beam incident on the object, especially so-called in-plane movements, which take place essentially in the object plane of the microscope, that is, in a plane, which is essentially perpendicular to the measurement beam of the vibrometer.

Here, an optical-system design can be used, which can be mounted on a camera connection of a microscope and which has on the other side, in turn, a correspondingly formed camera connection, on which a camera, typically a CCD camera, can be mounted. Over the beam path of the optical-system design, an object projection on the camera connection of the microscope is projected onto the second camera connection, so that the object projection can be recorded by the camera connected to the second camera connection. Simultaneously, the optical-system design contains a beam splitter for coupling light pulses of a stroboscopic lamp. The stroboscopic lamp emits light pulses at a pulse frequency, which corresponds to an excitation frequency, with which the object to be measured is excited simultaneously into periodic movements. By means of the evaluation of multiple time-offset camera images, this enables the determination of the in-plane movements of the object.

Thus, it is especially advantageous to combine this optical-system design for measuring in-plane movements with the apparatus according to the invention. Here, the apparatus according to the invention preferably has a decoupling beam splitter, which is arranged in the beam path of the confocal auto-focus microscope, so that a portion of the beams can be decoupled from the beam path of the confocal auto-focus microscope. However, because in this case a planar projection of the object is needed by the camera, or a planar illumination of the object is needed by the stroboscopic lamp, the beam splitter must be arranged in the beam path between the object to be measured and the spatial filter.

Preferably, the apparatus according to the invention has a connection for other optical components, preferably a C-mount connection, which is arranged on the apparatus according to the invention such that the beams decoupled by the decoupling beam splitter can emerge from the apparatus through this connection. Between the decoupling beam splitter and the connection, in the beam path of the beams decoupled by the decoupling beam splitter, there is an optical imaging system, which is embodied from at least one optical element, especially a lens, wherein the imaging system is embodied such that the object projection of the microscope is projected into the region of the connection. Consequently, the optical imaging system is comparable with previously known optical imaging system in optical microscopes, which have a camera connection. There, typically the object projection of the microscope is similarly projected by means of an imaging system into the region of the camera connection, so that the object projection can be recorded, for example, by means of a mounted camera.

Then the described optical-system design for measuring in-plane movement with the camera can be mounted on the connection.

Likewise, it is also possible, however, to integrate the camera and/or the stroboscopic lamp in the apparatus.

BRIEF DESCRIPTION OF THE DRAWINGS

One embodiment of the invention is described and explained in more detail below with reference to the single accompanying drawing.

DETAILED DESCRIPTION OF THE PREFERRED EMBODIMENT

Figure 1:
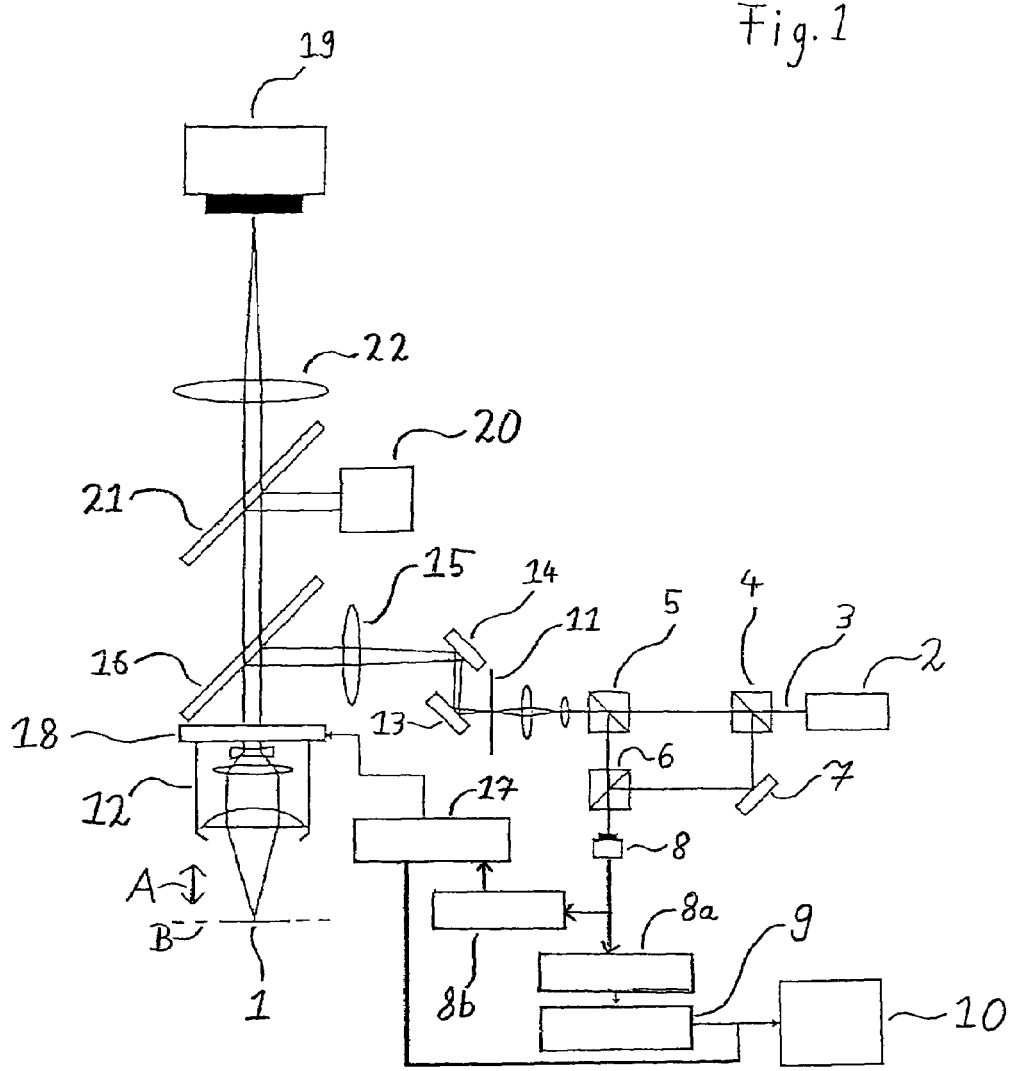

FIG. 1 shows the schematic design of an apparatus according to the invention for measuring an object 1. The apparatus comprises an interferometer, which is embodied as a laser Doppler vibrometer: a laser 2 generates a measurement beam 3, which is projected over the beam path of the apparatus onto the object 1, wherein the measurement beam reflected or scattered by the object 1 is in turn coupled over the beam path of the apparatus into the interferometer. There, the two beams are superimposed in a known way according to the type of a Mach-Zehnder interferometer by means of three beam splitters 4, 5, and 6 and a mirror 7 on a photodetector 8.

The output signal of the photodetector 8 is transmitted to a demodulator 8a. The demodulator 8a determines, in a known way, from the output signal of the photodetector 8 the phase shift of the beams superimposed in the interferometer or their time profile and transmits this to the correction unit 9.

The correction unit 9 is embodied such that it corrects measurement error in the signals of the demodulator 8a, which are based on the previously described Guoy effect.

Here, the correction unit 9 has a (not shown) memory unit, in which calibration data for the objective 12 of the microscope is stored. The calibration data was determined in the previously described way. The correction unit 9 now performs by means of the calibration data for each measurement point a correction of the movement of the object 1 measured by means of the interferometer at the measured measurement point and transmits the corrected data to the evaluation unit 10.

From the output data of the correction unit, the evaluation unit 10 calculates in a known way the movement of the object 1 at the measured measurement point. The evaluation unit 10 has available a (not shown) memory unit for storing the evaluated data and/or the output data of the correction unit.

The measurement beam 3 is projected over a confocal auto-focus microscope on the measurement point of the object 1 to be measured. The microscope comprises an aperture 11, which essentially suppresses non-focal beams, which are coupled into the beam path of the microscope from outside the focal point of the objective 12 of the microscope, so that these beams are not coupled into the beam path of the interferometer.

Non-focal beams are especially measurement beams, which are coupled in turn into the beam path of the microscope through reflection or scattering from a measurement point of the object, which is not located at the focal point of the objective 12.

The measurement beam 3 is projected onto the measurement object 1 in the beam path of the microscope over two scanning mirrors 13, 14, a lens 15, and a decoupling beam splitter 16, as well as over the objective 12. The measurement beam 3 can be tilted in each spatial direction by means of the scanning mirrors 13 and 14, wherein the two spatial directions are arranged relative to each other such that tilting of the measurement beam 3 in an arbitrary spatial direction is possible by combining the two tilting movements. This can be achieved, for example, in that the pivoting axes of the two scanning mirrors 13, 14 are perpendicular to each other.

By tilting the measurement beam 3 by means of the scanning mirrors 13 and 14, the measurement beam 3 can be directed onto different measurement points on the object 1.

In the embodiment shown in FIG. 1, the photodetector 8 is used not only for the measurement of the phase shift of the beams superimposed on the photodetector 8, it is also used as the focus detector for the auto-focus function.

As already described above, in the apparatus according to the invention, the measurement beam 3 of the interferometer is also used as the focusing beam for the auto-focus function of the microscope. For a confocal auto-focus microscope, the focusing beam has an intensity maximum when the measurement point to be measured is at the focal point and the intensity of the focusing beam decreases when the measurement point to be measured moves from the focal point of the microscope objective.

This also applies for the measurement beam 3 reflected on the measurement point after passing through the aperture 11, so that it has an intensity maximum when the measurement point of the object 1 is at the focal point of the objective 12.

For determining the intensity of the measurement beam 3 reflected on the measurement point of the object 1 after passing through the aperture 11, the embodiment according to the invention comprises an amplitude evaluation unit 8b, which is connected to the photodetector 8. The amplitude evaluation unit is embodied such that it performs a known determination of the modulation amplitude of the measurement signal of the photodetector 8, i.e., of the measurement signal based on the beams superimposed on the photodetector 8:

The amplitude of the measurement signal of the photodetector 8 is determined by several factors. Here, an essential factor is the superimposition of the reference beam transmitted by the laser 2 and projected over the beam splitters 4 and 6, as well as the mirror 7, on the photodetector with the measurement beam reflected by the object 1 and projected over the beam path of the microscope after passing through the aperture 11 via the beam splitters 5 and 6 on the photodetector 8.

The signal strength on the photodetector essentially depends on the phase shift of these two beams, i.e., on their interference. If the phase shift changes, then the signal strength on the photodetector also changes and reaches a maximum amplitude when there is constructive interference and a minimum amplitude when there is destructive interference. Thus, the amplitude is not suited as a measure for the intensity of the reflected measurement beam 3 after passing through the aperture 11.

The difference of the minimum and maximum amplitudes, however, is dependent on the distance of the measurement point of the object 1 reflecting the measurement beam 3 at the focal point of the objective 12 as described above based on the confocal property of the apparatus according to the invention: the difference is a maximum when the measurement point is at the focal point and decreases when the measurement point is at a distance from the focal point. Thus, by determining the difference of the minimum and maximum amplitudes of the signal strength on the photodetector 8, a measure for the intensity of the reflected measurement beam 3 after passing through aperture 11 can be determined.

For determining the difference of the minimum and maximum amplitudes, the phase between the reference beam and the reflected measurement beam must be shifted at least by one period of the measurement beam. This phase shift can take place in various ways:

Thus, e.g., the path length between the laser 2 and object 1 can be changed by up to a wavelength of the measurement beam 3 relative to the wavelength of the reference beam between laser 2 and photodetector 1. This is possible, e.g., by shifting the object along the axis A. Therefore, the ratio of the path lengths from the reflected measurement beam 3 and reference beam, which corresponds to a phase change, i.e., the shift of the object 1 along the axis A by a wavelength modulates the signal of the photodetector 8.

Furthermore, the vibrometer can be embodied as a known heterodyne interferometer, for which two optical waves with slightly different frequency are overlapped. This can be achieved, for example, such that between the mirror 7 and the beam splitter 6, an optical component is integrated into the beam path, which can shift the frequency of a light wave, such as, for example, an acousto-optical modulator.

In this case, a signal with the difference frequency of the two waves (the so-called heterodyne frequency) is produced on the photodetector 8, i.e., the signal of the photodetector 8 has a modulation without which the object 1 must be shifted. Also, the amplitude difference of this modulation is a maximum when the measurement point of the object is at the focal point of the objective 12 and decreases when the measurement point moves away from the focal point.

In both variants, the determination of the modulation amplitude of the signal of the photodetector 8 by the amplitude evaluation unit 8b leads to a result, which represents a measure for the intensity of the measurement beam 3 reflected at the measurement point of the object 1 after passing through the aperture 11.

The modulation amplitude is transmitted from the amplitude evaluation unit 8b to the focus controller 17.

The focus controller 17 is connected to a focusing device 18. The focusing device 18 is configured in this embodiment as electronically controllable positioning slits, which enables the objective 12 to move along the axis A of the measurement beam 3 incident on the object via piezoelectric elements.

The focus controller 17 regulates the focusing device 18 such that the signal output by the amplitude evaluation unit 8b is a maximum. Therefore, it is guaranteed that the measurement point of the object 1 is at the focal point of the objective 12.

The focus controller 17 is connected to the evaluation unit 10, also like the correction unit 9. The evaluation unit 10 receives the control signals of the focusing device 17 and can thus determine the movement path of the objective 12 by the focusing device 18, which is necessary so that the measurement point of the object 1 comes to lie at the focal point of the objective 12. For a scanning measurement method, in which several different points on the object 1 are measured one after the other, by comparing the movement paths, a height profile of the measurement points can be determined.

In the embodiment shown in FIG. 1, the memory unit of the evaluation unit 10 orders each measurement point first relative to the relative height compared with the other measured measurement points and second relative to the movement of the measurement point of the object 1 determined by means of the interferometer.

The evaluation unit 10 is also connected to a (not shown) scanner controller unit of the scanning mirrors 13 and 14. The scanner controller unit regulates the tilting position of the two scanning mirrors 13 and 14 such that for each individual measurement process the measurement beam 3 is incident on the previously selected measurement point on the object 1. The scanner controller unit transmits the necessary control signals to the evaluation unit 10. The evaluation unit 10 can thus also determine the relative position of the measurement points in the measurement plane B relative to each other, that is, in the plane perpendicular to the axis A of the measurement beam 3.

Therefore, in the memory unit at the measurement point an (x, y, z) spatial coordinate of the measurement point and the movement of the measurement point determined by means of the interferometer can be stored and allocated relative to each other.

So that movements with the embodiment shown in FIG. 1 can also be determined, which do not occur along the axis A of the measurement beam 3, especially in-plane movements, which occur in the object plane E of the microscope, the embodiment also comprises a CCD camera 19, a stroboscopic lamp 20, and a stroboscopic beam splitter 21 for coupling the light pulses of the stroboscopic lamp 20 into the beam path of the microscope. The light pulses of the stroboscopic lamp 20 are thus projected by the stroboscopic beam splitter 21 via the decoupling beam splitter 16 and the objective 12 onto the object 1.

The light pulses of the stroboscopic lamp 20 reflected or scattered by the object 1 are projected via the objective 12, the decoupling beam splitter 16, the stroboscopic beam splitter 21, and another lens 22 onto the CCD camera 19.

Because the aperture 11 is not located in the beam path between the stroboscopic lamp 20 and object or between the object and CCD camera 19, a planar illumination by means of the stroboscopic lamp 20 and a planar projection recording by means of the CCD camera 19 is possible. A comparison of the images recorded by the CCD camera 19 offset in time thus enables according to a known way a determination of the in-plane vibrations of the object. Here, the apparatus further has a (not shown) in-plane evaluation unit, which is connected to the evaluation unit 10.

Thus, for each measurement point, not only the (x, y, z) spatial coordinate and the movement along the axis A of the measurement beam 3, but also the movement determined by means of the in-plane evaluation unit in the object plane B at this measurement point can be stored in the memory unit of the evaluation unit 10.

For the time sequence of a measurement, several variants are possible. Thus, a measurement can be realized, for example, through the following steps:

1. First the measurement beam is aligned onto a measurement point of the object 1 to be measured by means of the scanning mirrors 13 and 14 and the corresponding positional information (x, y coordinates) are transmitted to the evaluation unit 10.

2. By means of the focus controller 17 and the focusing device 18, the object 12 is moved, such that the measurement point of the object 1 lies at the focal point of the objective 12 and the corresponding control signals are transmitted to the evaluation unit 10 for determining the height information (z-coordinate). Here, the amplitude evaluation unit 8b evaluates the modulation amplitude of the signal of the photodetector 8 after each movement of the object by a wavelength of the measurement beam 3 and the focus controller 17 regulates the focusing device 18 such that the modulation amplitude becomes a maximum.

3. By means of the interferometer, the movement of the measurement point of the object 1 along the optical axis of the measurement beam of the interferometer is determined, wherein the correction unit 9 corrects measurement errors in the measurement data of the photodetector 8, which are based on the Guoy effect, and the corrected measurement data is transmitted to the evaluation unit 10 for determining the movement of the object 1 at the measurement point.

4. The memory unit stores a data set for this measurement point with the (x, y, z) spatial coordinates and the movement data of this measurement point.

This measurement process is repeated for each provided measurement point.

Then, by means of the stroboscopic lamp 20 and the CCD camera 19, an in-plane measurement is performed, wherein the data of the determined in-plane measurement by the evaluation unit 10 is superimposed with the stored measurement data, such that for the measurement point, in addition to the already known information, also the movement in the object plane B of the microscope is stored.

Typically, the object 1 is excited for such measurements by a (not shown) external excitation unit into periodic vibrations.

In the measurement process described above, it is conceivable that this excitation during step 1, that is, during the auto-focus function, is turned off. However, because in general the vibration of the object due to the external excitation is small relative to the height difference of various measurement points to each other, it is also conceivable to let the object 1 also vibrate during the auto-focus function by means of the external excitation. In this case, the amplitude evaluation unit 8b would eliminate possible fluctuations in the measurement signal transmitted by the photodetector 8 via the correction unit 9, which are based in the vibration of the measurement object 1, through an averaging method.

With the embodiment according to the invention shown in FIG. 1, it is thus possible for the first time to correct measurement errors in the data of the interferometer, whose measurement beam is projected over a confocal auto-focus microscope onto an object and which are based on the Guoy effect. In addition, it is possible for the first time to determine with one apparatus both the positional coordinates of a measurement point and also movement data for movements along the optical axis of the interferometer, as well as movement data for in-plane movements in the object plane of the microscope.

The apparatus thus permits a comprehensive and in accuracy previously impossible analysis of miniaturized components. Especially for comparison between simulation models and real test objects in the microsystem technology, data sets are necessary, which enable for the measurement points both the determination of the (x, y, z) spatial coordinate and also movement data for movements along the optical axis of the interferometer at these measurement points. This can be guaranteed by the present invention with high accuracy.

The invention claimed is:

1. Apparatus for optical measurement of an object (1), comprising
   an interferometer for measuring movements along an axis (A) of a measurement beam (3) which passes through the interferometer,
   a microscope with an objective (12) and a focusing device (18), the focusing device (18) changes a relative position of the object (1) and a focal point of the objective (12) relative to each other in response to signals from a focus controller, the interferometer and the microscope are located relative to each other such that the measurement beam (3) which passes through the interferometer is projected over a beam path of the microscope onto the object (1), the microscope comprises a confocal auto-focus microscope which includes the focus controller (17), a focus detector (8), a light source for generating a focusing beam, and a spatial filter (11), which is arranged in the beam path of the confocal auto-focus microscope, such that the filter essentially suppresses non-focal beams, which are incident on the objective (12) from points outside of the focal point of the objective (12), the focusing beam is generated by a light source projected over the objective (12) onto the object (1) and onto a focus detector (8), and the focus controller (17) communicates with the focusing device (18) and the focus detector (8) such that the focus detector (8) outputs measurement signals to the focus controller (17) and the focus controller (17) controls the focusing device (18) depending on the measurement signals such that a measurement point of the object (1) comes to lie at the focal point of the objective (12), and the focusing beam is formed by light which passes through the interferometer.

2. Apparatus according to claim 1, wherein the apparatus further comprises a correction unit (9), which is connected to the interferometer and which corrects measurement errors in the measurement data of the interferometer, including a measurement error based on the Guoy effect.

3. Apparatus according to claim 2, wherein the correction unit (9) contains calibration data and corrects the measurement error in the measurement data of the interferometer, including a measurement error based on the Guoy effect, using the calibration data.

4. Apparatus according to claim 3, wherein the microscope comprises at least a second objective, the first and the second objectives are arranged on the microscope such that the first objective is selectively replaceable by the second objective, and the correction unit (9) comprises a calibration database, in which at least two calibration data sets, each allocated to one of the two objectives, are stored, the correction unit (9) selects one of the calibration data sets selectively and the correction unit (9) performs the correction of the measurement data of the interferometer using the selected calibration data set.

5. Apparatus according to claim 1, wherein the confocal auto-focus microscope comprises an evaluation unit (10), which is connected to the focus controller (17) to at least one of evaluate or store control signals of the focus controller (17).

6. Apparatus according to claim 5, wherein the confocal auto-focus microscope is a scanning confocal auto-focus microscope and comprises a scanner controller unit and an optical shift element (13, 14) or an object shift apparatus, the scanner controller unit is equipped with the optical shift element (13, 14) or the object shift apparatus such that the scanner controller unit controls the optical shift element (13, 14) or the object shift apparatus using the control signals, such that the measurement beam is projected selectively onto at least two different measurement points of the object (1), the optical shift element (13, 14) is arranged in the beam path of the confocal auto-focus microscope and shifts or tilts the measurement beam (3) depending on the control signals of the scanner controller unit, such that the measurement beam is projected selectively onto the at least two different measurement points of the object (1), and the object shift apparatus shifts or rotates the object (1) relative to the measurement beam (3) depending on the control signals of the scanner controller unit so that the measurement beam (3) is projected selectively onto the at least two different measurement points of the object (1).

7. Apparatus according to claim 6, wherein the evaluation unit (10) is connected to the interferometer and to the scanner controller unit and comprises a memory unit, which stores data of the focus controller (17), which is comprised of data for at least one of the control signals of the focus controller (17) or the evaluated control signals of the focus controller (17), data of the scanner controller unit, which is comprised of data for at least one of the control signals of the scanner controller unit or the evaluated control signals of the scanner controller unit, and data of the interferometer, which is comprised of at least one of measurement data of the interferometer or the evaluated measurement data of the interferometer, wherein the memory unit allocates the data of the focus controller (17), the data of the scanner controller unit, and the data of the interferometer for each measurement point of the object (1) relative to each other.

8. Apparatus according to claim 7, wherein the evaluation unit (10) is connected via a correction unit (9), which is connected to the interferometer and which is adapted to correct measurement errors in the measurement data of the interferometer, and the memory unit is adapted to store data of the interferometer, which is composed of the corrected measurement data of the interferometer.

9. Apparatus according to claim 1, wherein the interferometer is a laser-Doppler vibrometer.

10. Apparatus according to claim 1, wherein the focus detector (8) comprises a photodetector.

11. Apparatus according to claim 1, wherein the apparatus comprises a beam splitter for the measurement beam, which is arranged in the beam path of the apparatus such that a portion of the measurement beam reflected from the beam splitter for the measurement beam is incident on the focus detector.

12. Apparatus according to claim 11, wherein the beam splitter for the measurement beam is arranged between the spatial filter (11) and the interferometer in the beam path of the apparatus.

13. Apparatus according to claim 1, wherein the interferometer comprises a movement intensity detector, which is arranged in the beam path of the interferometer such that beams superimposed in the interferometer are projected on the movement intensity detector and the movement intensity detector is the focus detector (8).

14. Apparatus according to claim 6, wherein the optical shift element comprises a scanning mirror (13, 14), especially a piezoelectric scanning mirror.

15. Apparatus according to claim 1, wherein the focusing device (18) is located at the objective (12) such that the objective (12) is movable along the axis (A) of the measurement beam of the interferometer.

16. Apparatus according to claim 1, wherein the confocal auto-focus microscope has a beam splitter (16), which is arranged in the beam path of the confocal auto-focus microscope for reflecting a portion of the beams from the beam path of the confocal auto-focus microscope, and the beam splitter (16) is arranged in the beam path between the object (1) and the spatial filter (11).

17. Apparatus according to claim 1, wherein the apparatus comprises a camera (19) for planar projection of the measurement object or an illuminating device for planar illumination of the object (1), wherein the camera (19) or the illumination device are arranged in the beam path of the beams split by the beam splitter (16).

18. Apparatus according to claim 17, wherein the planar illumination comprises stroboscopic illumination (20, 21), and the apparatus comprises an in-plane evaluation unit, wherein the in-plane evaluation unit is connected to the camera (19) and is adapted to evaluate several images of the camera (19) recorded offset in time, such that movement of the object (1) in a plane perpendicular to the measurement beam (3) can be detected.

19. Apparatus according to claim 15, wherein the positioning slits comprise piezoelectric positioning slits.

20. Apparatus according to claim 17, wherein the camera comprises a CCD camera.

21. Method for optical measurement of an object (1) comprising:

projecting a measurement beam (3) from an interferometer onto the object (1) by means of a confocal auto-focus microscope;

regulating a focusing device (18) of the confocal auto-focus microscope using a focus controller (17), which receives measurement signals from a focus detector (8), such that a measurement point of the object (1) comes to lie at a focal point of an objective (12) of the confocal auto-focus microscope;

measuring vibrations of the object (1) in a direction of the measurement beam of the interferometer (3) using the interferometer and an evaluation unit (10) connected to the interferometer, and correcting measurement data from the interferometer, including measurement error based on the Guoy effect, using a correction unit (9), which is connected to the interferometer and to the evaluation unit (10).

22. Method according to claim 21, wherein the correcting of the measurement data of the interferometer further comprises:

determining characteristic data of the objective (12) of the auto-focus microscope;

selecting an objective-specific calibration data set from a calibration database of the correction unit (9), which contains an objective-specific calibration data set for multiple sets of objective characteristic data, using the characteristic data of the objective (12);

correcting the measurement error occurring due to the Guoy effect in the measurement data of the interferometer using the correction unit (9), wherein the correction unit (9) performs the correction based on the selected objective-specific calibration data set.

* * * * *